United States Patent Office 3,661,913
Patented May 9, 1972

3,661,913
8-LOWER ALKOXYISOQUINOLINIUM HALIDES
Willy Leimgruber, Montclair, and Fausto Eugenio Schenker, Bloomfield, N.J., assignors to Hoffmann-La Roche Inc., Nutley, N.J.
No Drawing. Original application Aug. 30, 1967, Ser. No. 664,269, now Patent No. 3,562,280, dated Feb. 9, 1971. Divided and this application Sept. 9, 1970, Ser. No. 70,923
Int. Cl. C07d 35/10
U.S. Cl. 260—286 Q    4 Claims

ABSTRACT OF THE DISCLOSURE

Novel pharmacologically active 8-(lower alkoxy)-1,2,3,4-tetrahydroisoquinolines, 8-(lower alkoxy)-1 and/or 2-(lower alkyl)-1,2,3,4-tetrahydroisoquinolines and intermediates therefor, are prepared utilizing, for example, 8-isoquinolinol as a starting material. The pharmacologically active compounds of the invention are useful as hypotensive agents.

CROSS-REFERENCE TO RELATED APPLICATIONS

This application is a division of U.S. patent application Ser. No. 664,269, filed Aug. 30, 1967 and issued on Feb. 9, 1971 as U.S. Pat. No. 3,562,280.

BRIEF SUMMARY OF THE INVENTION

In one aspect, the invention relates to substituted isoquinolinium compounds of the formula

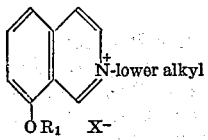

wherein $R_1$ is lower alkyl and $X^-$ is selected from the group consisting of iodine, chlorine and bromine.

In another aspect, the invention relates to compounds of the formula

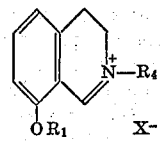

wherein $R_1$ is lower alkyl, $R_4$ is selected from the group consisting of lower alkyl and benzyl, and $X^-$ is selected from the group consisting of chlorine, bromine and iodine.

In still another aspect, the invention relates to compounds of the formula

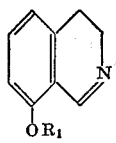

wherein $R_1$ is lower alkyl.

The foregoing compounds are useful in the preparation of substituted 1,2,3,4-tetrahydroisoquinolines of the formula

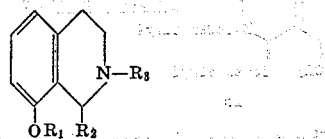

I wherein $R_1$ is lower alkyl and $R_2$ and $R_3$ are hydrogen or lower alkyl, and acid addition salts thereof with pharmaceutically acceptable acids. The compounds of the invention, i.e., the compound of Formula I, are useful as hypotensive agents.

DETAILED DESCRIPTION OF THE INVENTION

The invention relates to pharmacologically active 1,2,3,4-tetrahydroisoquinolines of the formula

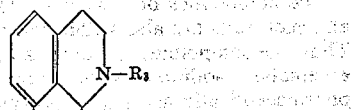

I wherein $R_1$ is lower alkyl and $R_2$ and $R_3$ are independently selected from the group consisting of hydrogen and lower alkyl, and acid addition salts thereof with pharmaceutically acceptable acids.

In a particularly advantageous aspect, the invention relates to the subgenus characterized by the formula

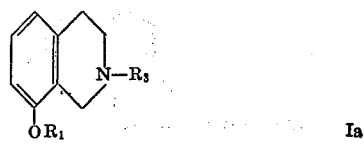

Ia wherein $R_1$ and $R_3$ are as previously described,
and acid addition salts thereof with pharmaceutically acceptable acids.

In another aspect, the invention relates to the subgenus characterized by the formula

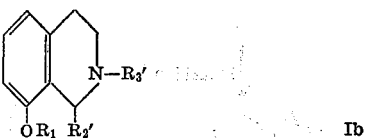

Ib wherein $R_1$ is as previously described, and $R_2'$ and $R_3'$ are lower alkyl,
and acid addition salts theerof with pharmaceutically acceptable acids.

In still another aspect, the invention relates to novel intermediates characterized by the formulas

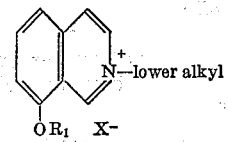    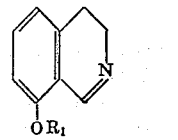

VI    XI

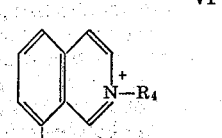    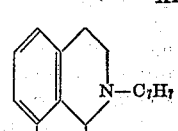

XII    XIV wherein $R_1$ is a previously described, $X^-$ is a halogen such as chlorine, bromine or iodine, and $R_4$ is lower alkyl or benzyl.

As used herein, the term "lower alkyl" denotes a straight or branched chain hydrocarbon group containing 1–7 carbon atoms, e.g., methyl, ethyl, propyl, isopropyl, butyl, tertiary butyl and the like; methyl is preferred. The term "lower alkoxy" denotes a lower alkyl ether group in which the lower alkyl moiety is as described above; methoxy is preferred.

Examples of the compounds of Formula I are:
8-methoxy-1,2,3,4-tetrahydroisoquinoline;
8-methoxy-2-methyl-1,2,3,4-tetrahydroisoquinoline;
8-methoxy-1-methyl-1,2,3,4-tetrahydroisoquinoline;
8-methoxy-1,2-dimethyl-1,2,3,4-tetrahydroisoquinoline;
and acid addition salts thereof with pharmaceutically acceptable acids. Of these, the most preferred are 2-methoxy - 2 - methyl-1,2,3,4-tetrahydroisoquinoline and acid additional salts thereof with pharmaceutically acceptable acids.

The compounds of Formula I form acid addition salts and such salts are also within the scope of this invention. Thus, the compounds of Formula I form pharmaceutically acceptable addition salts with, for example, both pharmaceutically acceptable organic and inorganic acids, such as acetic acid, succinic acid, formic acid, methanesulfonic acid, p-toluene-sulfonic acid, hydrochloric acid, nitric acid, phosphoric acid, sulfuric acid and the like.

The compounds of Formula I are prepared according to processes illustrated by the following reaction schemes:

Scheme I

Process A                    Process B

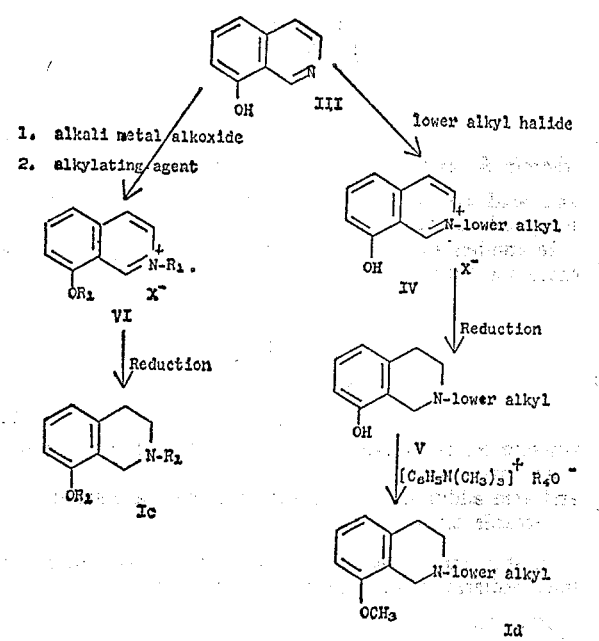

wherein $R_1$ is as previously described, $R_4$ is hydrogen or lower alkyl, halide is iodide, chloride or bromide and $X^-$ is iodine, chlorine or bromine.

Process A of Scheme I is carried out by reacting 8-isoquinolinol (III), a known compound, with an alkylating agent, such as methyl iodide, in the presence of an alkali metal alkoxide, such as sodium methylate, at a temperature in the range of from about 25° to about 80° to form a compound of Formula VI. A compound of Formula VI is then reduced utilizing, for example, sodium borohydride or hydrogen under pressure in the presence of platinum oxide, to form the corresponding compound of Formula Ic. Process B of Scheme I is carried out by reacting 8-isoquinolinol with a lower alkyl halide, such as methyl iodide, or a dialkyl sulfate, such as dimethyl sulfate, to yield a compound of Formula IV. A compound of Formula IV is then reduced, for example, with hydrogen under pressure in the presence of platinum oxide to form the corresponding compound of Formula V. A compound of Formula V is reacted with phenyltrimethylammonium chloride in the presence of an alkali metal alkoxide, such as sodium methoxide, or an alkali metal hydroxide, such as sodium hydroxide, to yield the corresponding compound of Formula Id.

Scheme II

Process C                    Process D

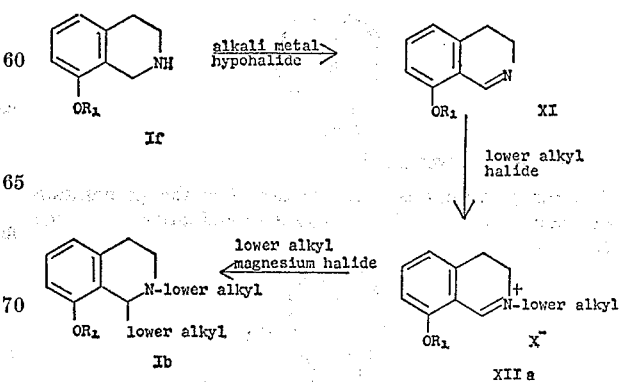

Process C of Scheme II is carried out by reducing the 8-isoquinolinol, as previously described, to form the compound of Formula VIII. The compound of Formula VIII is reacted with formic acid and tertiary amine, such as triethylamine, to form the compound of Formula IX, which is in turn reacted with an alkylating agent, such as methyl iodide, in the presence of an alkali metal alkoxide, such as sodium methylate, to form a compound of Formula X. A compound of Formula X is treated with a mineral acid, such as hydrochloric or sulfuric acid, to form the corresponding compound of Formula If.

Process D of Scheme II is carried out by reacting the 8-isoquinolinol with phenyltrimethylammonium chloride in the presence of an alkali metal alkoxide, such as sodium methoxide, or an alkali metal hydroxide, such as sodium hydroxide, to yield the compound of Formula VII. The compound of Formula VII is reduced, for example, utilizing hydrogen under pressure in the presence of platinum oxide to form the compound of Formula Ie.

Scheme III

The reaction of Scheme III is carried out by reacting an 8-alkoxy-1,2,3,4-tetrahydroisoquinoline of Formula If with an alkali metal hypohalide, such as sodium hypochloride, to yield a compound of Formula XI. A compound of Formula XI is then reacted with a lower alkyl halide, such as methyl iodide, to yield the corresponding compound of Formula XIIa. A compound of Formula XIIa is reacted with a lower alkyl magnesium halide, such as methyl magnesium iodide, to yield the corresponding compound of Formula Ib.

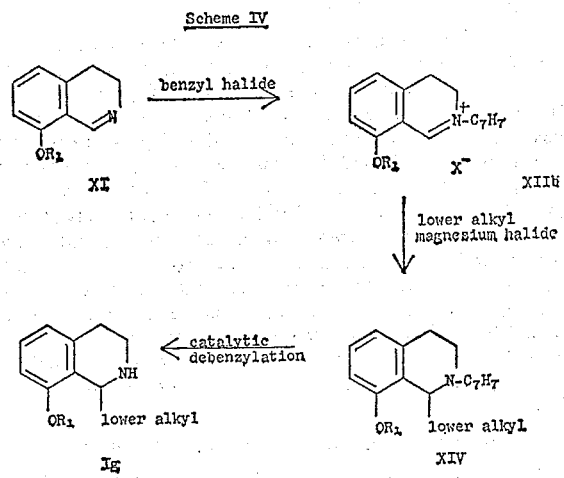

The reaction of Scheme IV is carried out by reacting a compound of Formula XI with a benzyl halide, such as benzyl bromide, to yield a compound of Formula XIIb. A compound of Formula XIIb is then reacted with a lower alkyl magnesium halide, such as methyl magnesium iodide, to yield the corresponding compound of Formula XIV, whcih can be catalytically debenzylated, for example by reacting with hydrogen in the presence of palladium on charcoal, to form the corresponding compound of Formula Ig.

All the reactions described above may be conducted in the presence of added solvent such as methanol, methylene chloride, benzene, toluene, ethanol, ether and the like. The temperatures at which the processes described above are carried out are not critical, however, temperatures in the range of about 25° C. to 80° C. are preferably utilized. The reaction products of the invention may be recovered employing conventional techniques, such as filtration, extraction and the like.

The compounds of Formula I lower blood pressure and cause vasodilation. More particularly, they effect an increase in the peripheral vascular blood flow with a decrease in peripheral vascular resistance without any substantial inhibition of the peripheral autonomic system and with only minimal blocking effects upon the adrenergic effector sites. Moreover, the compounds of Formula I possess the advantage of being devoid of certain undesirable effects, for instance, they do not significantly increase the heart rate. Thus, the compounds of the invention are useful, for example, in the treatment of vascular diseases such as hypotension.

The vasodilator and blood pressure reducing properties of the compounds of Formula I can be demonstrated in warm-blooded animals utilizing standard procedures, for example, in nembutalized dogs anesthetized, heparinized, and prepared for recording of the systemic blood pressure and the pressure in a constant flow-perfused hind limb. In particular, blood from a cannulated carotid artery is passed by tube through a sigmomotor pump to a distally cannulated femoral artery. The pressure between the constant flow pump and the hind limb is monitored throughout the study. Changes in the vascular resistance result in changes in the perfusion pressure. Control responses to intravenously injected norepinephrine and histamine are obtained and the test drug is administered intravenously at 4.0 mg./kg.

Illustrative of the results obtained, for example, with 8-methoxy-2-methyl-1,2,3,4-tetrahydroisoquinoline, which has an $LD_{50}$ of 223 mg./kg. p.o. and 46 mg./kg. i.v. in mice after 72 hours, are those set forth in Table I below.

TABLE I

|  | Dog No. 1 | | | Dog No. 2 | | |
| --- | --- | --- | --- | --- | --- | --- |
|  | Average predose B.P., mm. Hg | B.P. change, mm. Hg | Duration, minutes | Average perfusion pressure predose | Perfusion pressure change | Duration, minutes |
| Norepinephrine | 70 | +80 | 3.0 | 100 | +40 | 2.0 |
| Histamine | 95 | −40 | 1.0 | 125 | −70 | 2.0 |
| 8-methoxy-2-methyl-1,2,3,4-tetrahydroisoquinoline | 95 | −60 | 5.0 | 125 | −85 | 5.0 |
| 15 minutes | 80 | −15 |  | 70 | −55 |  |
| 30 minutes | 80 | −15 |  | 70 | −55 |  |
| 60 minutes | 80 | −15 |  | 70 | −55 |  |

For use as hypotensive agents, the novel compounds of Formula I are formulated, using conventional inert pharmaceutical adjuvant materials, into dosage forms which are suitable for oral or parenteral administration. Such dosage forms include tablets, suspensions, solutions, etc. Furthermore, the compounds of this invention can be embodied into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene glycols, etc. Moreover, preservatives, stabilizers, wetting agents, emulsifying agents, salts for altering osmotic pressure, buffers, etc. can be incorporated, if desired, into such formulations.

The quantity of active medicament which is present in any of the above-described dosage forms is variable. It is preferred, however, to provide capsules or tablets containing from about 10 mg. to about 50 mg. of the Formula I base or an equivalent amount of a medicinally acceptable acid addition salt thereof. For parenteral administration, it is preferred to provide a solution containing from about 1 mg./ml. to about 10 mg./ml. of the Formula I base, or an equivalent quantity of a salt thereof.

The frequency with which any such dosage form will be administered to a warm-blooded animal will vary, depending upon the quantity of active medicament present therein and the needs and requirements of the warm-blooded animal, as diagnosed by the prescribing practitioner. Under ordinary circumstances, however, up to about 250 mg./kg. of the compound can be administered daily in several oral doses. It is to be understood, however, that the dosages set forth therein are exemplary only and that they do not, to any extent, limit the scope or practice of this invention.

The following non-limiting examples further illustrate the invention. All parts are by weight and all temperatures are in degrees centigrade, unless otherwise mentioned.

Example 1.—Preparation of 8-hydroxy-2-methylisoquinolinium iodide

A solution of 3.63 g. of 8-isoquinolinol and 4 ml. of methyl iodide in 50 ml. of ethanol was stirred at reflux temperature for 8 hours, cooled and filtered to give, after recrystallization from ethanol-ethyl acetate, 8-hydroxy-2-methylisoquinolinium iodide, having a melting point of 220–221°.

Example 2.—Preparation of 2-methyl-1,2,3,4-tetrahydro-8-isoquinolinol

A solution of 2.87 g. of 8-hydroxy-2-methylisoquinolinium iodide in 200 ml. of ethanol was hydrogenated over platinum oxide at room temperature and at 50 p.s.i. pressure. The catalyst was removed by filtration and the filtrate was evaporated to dryness. The residue was dissolved in 100 ml. of methanol and treated with 516.5 mg. of sodium methylate in methanol. The solvent was evaporated under reduced pressure, and the solid residue was extracted with boiling methylene chloride. The extract was evaporated to dryness to yield 1.6 g. of 2-methyl-1,2,3,4-tetrahydro-8-isoquinolinol, M.P. 170–173.5°.

Example 3.—Preparation of 8-methoxy-2-methylisoquinolinium iodide

A solution containing 2.0 g. of 8-isoquinolinol in methanol was treated with 754.6 mg. of sodium methoxide in methanol. The solution was evaporated to dryness. The residue was dissolved in 50 ml. of ethanol, and thereafter 3.5 ml. of freshly distilled methyl iodide were added. The resulting solution was stirred at reflux temperature for 16 hours. Filtration of the reaction mixture yielded 3.39 g. of crude material, which was crystallized from methanol-ether to yield 2.97 g. of 8-methoxy - 2 - methylisoquinolinium iodide as yellow crystals, M.P. 231–232°.

Example 4.—Preparation of 8-methoxy - 2 - methyl-1,2,3,4-tetrahydroisoquinoline hydrochloride from 2-methyl-1,2,3,4-tetrahydro-8-isoquinolinol 689 mg. of 2-methyl-1,2,3,4-tetrahydro-8-isoquinolinol were dissolved in 150 ml. of benzene. After the addition of 764 mg. of phenyltrimethylammonium chloride and 4.45 ml. of 1 N sodium hydroxide, the solution was heated at reflux temperature for 8 hours. The water formed during the reaction was collected in a Dean-Stark trap. The reaction mixture was cooled, washed with dilute sodium hydroxide and then with water. After the addition of water to the organic phase, the resulting two phase mixture was stirred vigorously and adjusted to pH 6.0 with 1 N hydrochloric acid. The aqueous acid layer was made strongly alkaline with 1 N sodium hydroxide and extracted with methylene chloride. The organic layer was washed with water, dried with sodium sulfate and evaporated to dryness to yield 503 mg. of liquid 8-methoxy-2-methyl-1,2,3,4-tetrahydroisoquinoline. This material was dissolved in 25 ml. of methanol, and the solution was made strongly acidic with ethanolic hydrogen chloride and evaporated to dryness. The residue was recrystallized from methanol-ether, yielding 310 mg. of the hydrochloride of 8-methoxy-2-methyl-1,2,3,4-tetrahydroisoquinoline, M.P. 215–216°.

Example 5.—Preparation of 8-methoxy-2-methyl-1,2,3,4-tetrahydroisoquinoline hydrochloride from 8-methoxy-2-methylisoquinolinium iodide A solution containing 2 g. of 8-methoxy-2-methylisoquinolinium iodide in ethanol was hydrogenated over platinum oxide at room temperature and at 50 p.s.i. pressure. The catalyst was removed by filtration, and the filtrate was evaporated to dryness under reduced pressure to give 1.88 g. of the hydroiodide. This material was dissolved in 25 ml. of 1 N sodium hydroxide and the solution was extracted with methylene chloride. The organic layer was washed with water, dried with sodium sulfate, and evaporated under reduced pressure to give 1.09 g. of oil. An ethanolic solution of this material was treated with hydrogen chloride in ethanol, and then evaporated to dryness. The residue was crystallized from ethanol-ether to give 1.13 g. of white crystalline 8-methoxy-2-methyl-1,2,3,4-tetrahydroisoquinoline hydrochloride, M.P. 215–216°.

Example 6.—Preparation of 8-methoxyisoquinoline

To a solution of 29 g. of 8-isoquinolinol and 11.35 g. of sodium methylate in 175 ml. of methanol, 36.1 g. of phenyltrimethylammonium chloride were added. The mixture was stirred for one hour, filtered to remove the precipitated salt, and then evaporated under reduced pressure. The oily residue was dissolved in 150 ml. of dimethylformamide. The solution was heated at reflux for two hours, cooled, and then evaporated. The residue was dissolved in 250 ml. of methylene chloride and extracted with 1 N sodium hydroxide solution. The aqueous layer was extracted with methylene chloride. The organic layer was then washed with water, dried with sodium sulfate, treated with charcoal, and evaporated to dryness to give 43.2 g. of dark oil. Dimethylaniline was removed from this material by distillation at 58–89° C./17–18 mm., and the distillation residue was filtered through a column containing 10 g. of alumina II. The column was eluted with ether, and after evaporation of the eluate 25.8 g. of light brown liquid was obtained. Crystallization from ether-pentane gave 20.6 g. of pure 8-methoxyisoquinoline, M.P. 48–51°.

The corresponding hydrochloride salt was prepared as follows:

A solution of 21.86 g. 8-methoxyisoquinoline in 125 ml. of methanol was acidified with ethanolic hydrogen chloride and evaporated to dryness to yield 26.8 g. of the hydrochloride salt of 8-methoxyisoquinoline as a yellowish solid, M.P. 170–170.5°.

Example 7.—Preparation of 8-methoxy-1,2,3,4-tetrahydroisoquinoline hydrochloride A solution of 26.8 g. of 8-methoxyisoquinoline hydrochloride in 600 ml. of ethanol was hydrogenated with platinum oxide catalyst at room temperature and 50 p.s.i. of pressure. The catalyst was removed by filtration and the filtrate evaporated to dryness. The solid residue was crystallized from methanol-ether to give 17.5 g. of 8-methoxy-1,2,3,4 - tetrahydroisoquinoline hydrochloride as white crystalls, M.P. 260.5–263°.

Example 8.—Preparation of 8-methoxy-3,4-dihydroisoquinoline

A solution of 2.8 g. of 8-methoxy-1,2,3,4-tetrahydroisoquinoline hydrochloride in 100 ml. of methanol was neutralized with 756.5 mg. of sodium methylate in methanol. After evaporation of the solvent, the residue was extracted with ether. Removal of the solvent gave 2.23 g. of 8-methoxy-1,2,3,4-tetrahydroisoquinoline, which was dissolved in 75 ml. of methanol and stirred for 2 hours at room temperature with 6.12 ml. of a 16.6% sodium hypochlorite solution. After the addition of 6.92 g. of sodium hydroxide pellets, the reaction mixture was refluxed for 2 hours, and then evaporated to dryness. The residue was mixed with water and extracted with methylene chloride. The organic layer was washed with water, dried with sodium sulfate, treated with charcoal, and evaporated to dryness. The liquid residue was dissolved in ether, treated with Dry Ice, filtered, and then evaporated to yield 2.1 g. of 8-methoxy-3,4-dihydroisoquinoline as an oil.

The hydrochloride salt was prepared as follows:

A solution of 377 mg. of 8-methoxy-3,4-dihydroisoquinoline in 25 ml. of methanol was treated with charcoal, and acidified with ethanolic hydrogen chloride. Removal of the solvent yielded 461 mg. of crude hydrochloride, which was crystallized from methanol-benzene and then from methylene chloride-ether to give 238 mg. of 8-methoxy-3,4-dihydroisoquinoline hydrochloride as pale yellow crystals, M.P. 175–175.5.

Example 9.—Preparation of 8-methoxy-2-methyl-3,4-dihydroisoquinolinium iodide

A solution of 8.0 g. of 8-methoxy-3,4-dihydroisoquinoline in 250 ml. of benzene was stirred with 15 ml. of methyl iodide for 65 hours at room temperature. The reaction mixture was chilled. The solid that formed was collected by filtration and crystallized from methanol-ether to give 12.4 g. of yellow crystalline 8-methoxy-2-methyl-3,4-dihydroisoquinolinum iodide, M.P. 182–182.5°.

Example 10.—Preparation of 8-methoxy-1,2-dimethyl-1,2,3,4-tetrahydroisoquinoline hydrochloride To a concentrated ether solution of methylmagnesium iodide, prepared from 6.52 g. of magnesium and 16.7 ml. of methyl iodide, 8.12 g. of 8-methoxy-2-methyl-3,4-dihydroisoquinolinium iodide were added in small portions. The mixture was refluxed for 1.5 hours, cooled, decomposed with a saturated aqueous sodium sulfate solution, and then diluted with 200 ml. of water. The aqueous mixture was extracted with ether. The ether phase was washed with water, dried with sodium sulfate, treated with charcoal, filtered and evaporated to give 3.82 g. of 8-methoxy-1,2-dimethyl-1,2,3,4-tetrahydroisoquinoline. A solution of 535 mg. of this material in 25 ml. of ethanol was acidified with ethanolic hydrogen chloride and evaporated to dryness. The residue was crystallized from methylene chloride-ether to yield 529 mg. of 8-methoxy-1,2-dimethyl-1,2,3,4-tetrahydroisoquinoline hydrochloride, M.P. 159.5–161.5°.

Example 11.—Preparation of 8-ethoxy-2-ethyl-1,2,3,4-tetrahydroisoquinoline hydrochloride A solution of 4.0 g. of 8-isoquinolinol in 100 ml. of ethanol was mixed with 1.635 g. of sodium methylate, heated to reflux temperature, and treated with 10 ml. of ethyl iodide. The mixture was stirred at reflux temperature for 16 hours, concentrated to about 50 ml. and chilled. Filtration of the reaction mixture yielded 5.42 g. of yellow solid material, which was crystallized from methanol-ether to give 3.84 g. of 8-ethoxy-2-ethylisoquinolinium iodide, M.P. 175–210°.

A solution of 3.3 g. of this material in 60 ml. of 50% aqueous isopropanol was stirred during the gradual addition of 1.3 g. of sodium borohydride (over a 10 minute period). The mixture was stirred for 3 hours and then evaporated under reduced pressure. The residue was suspended in 1 N sodium hydroxide and the suspension was extracted with ether. The organic layer was washed with water, dried with sodium sulfate and evaporated to give 824 mg. of 8-ethoxy-2-ethyl-1,2,3,4-tetrahydroisoquinoline. An ethereal solution of this base was acidified with ethanolic hydrogen chloride and then evaporated. The residue was crystallized from methanol-ether to give 780 mg. of the white, crystalline 8-ethoxy-2-ethyl-1,2,3,4-tetrahydroisoquinoline hydrochloride, M.P. 206.5–207°.

Example 12.—Preparation of 2-ethyl-8-methoxy-isoquinolinium iodide

A solution of 4.0 g. of 8-methoxyisoquinoline and 6.0 ml. of ethyl iodide in 50 ml. of ethanol was heated for 8 hours at reflux temperature and chilled. The precipitate was removed by filtration to give 6.3 g. of yellow powder, M.P. 205–208°, which was crystallized from methanol-ether to yield 5.6 g. of bright yellow crystalline 2-ethyl-8-methoxy-isoquinolinium iodide, M.P. 209–209.5°.

Example 13.—Preparation of 2-ethyl-8-methoxy-1,2,3,4-tetrahydroisoquinoline hydrochloride A solution of 5.11 g. of 2-ethyl-8-methoxy-isoquinolinium iodide in 100 ml. of 50% aqueous isopropanol was stirred during the gradual addition of 2.31 g. of sodium borohydride (over a 10-minute period). After 4 hours of stirring at room temperature, the mixture was evaporated under reduced pressure. The residue was treated with 50 ml. of water, and the mixture was extracted with methylene chloride. The organic layer was washed with water, dried with sodium sulfate and evaporated to give 3.1 g. of crude liquid 2-ethyl-8-methoxy-1,2,3,4-tetrahydroisoquinoline. A solution of this material in ethanol was acidified with ethanolic hydrogen chloride and evaporated, yielding 3.37 g. of solid which was crystallized from methanol-ether to give 2.39 g. of the 2-ethyl-8-methoxy-1,2,3,4-tetrahydroisoquinoline hydrochloride, M.P. 195–195.5°.

Example 14.—Capsule formulation

| | Per capsule, mg. |
|---|---|
| 8-methoxy-2-methyl-1,2,3,4,-tetrahydroisoquinoline hydrochloride | 25 |
| Lactose | 158 |
| Corn Starch | 37 |
| Talc | 5 |
| Total weight | 225 |

Procedure: 25 parts of 8-methoxy-2-methyl-1,2,3,4-tetrahydroisoquinoline hydrochloride were mixed with 158 parts of lactose and 37 parts of corn starch in a suitable mixer. The mixture was further blended by passing through a Fitzpatrick Comminuting Machine with a No. 1A screen with knives forward. The blended powder was returned to the mixer and 5 parts of talc were added and blended thoroughly. The mixture was then filled into No. 4 hard shell gelatin capsules on a Parke Davis capsulating machine.

Example 15.—Capsule formulation

| | Per capsule, mg. |
|---|---|
| 8-methoxy-2-methyl-1,2,3,4-tetrahydroisoquinoline hydrochloride | 50 |
| Lactose, U.S.P. | 125 |
| Corn starch, U.S.P. | 30 |
| Talc, U.S.P. | 5 |
| Total weight | 210 |

Procedure: 50 parts of 8-methoxy-2-methyl-1,2,3,4-tetrahydroisoquinoline hydrochloride were mixed with 125 parts of lactose and 30 parts of corn starch in a suitable mixer. The mixture was further blended by passing through a Fitzpatrick Comminuting Machine with a No. 1A screen with knives forward. The blended powder was returned to the mixer and 5 parts of talc were added and blended thoroughly. The mixture was filled into No. 4 hard shell gelatin capsules on a Parke Davis capsulating machine.

Example 16.—Tablet formulation

| | Per tablet, mg. |
|---|---|
| 8-methoxy - 1,2,3,4 - tetrahydroisoquinoline hydrochloride | 10.0 |
| Lactose | 113.5 |
| Corn starch | 70.5 |
| Pregelatinized corn starch | 8.0 |
| Calcium stearate | 3.0 |
| Total weight | 205.0 |

Procedure: 10 parts of 8-methoxy-1,2,3,4-tetrahydroisoquinoline hydrochloride were mixed with 113.5 parts of lactose, 70.5 parts of corn starch and 8 parts of pregelatinized corn starch in a suitable size mixer. The mix was passed through a Fitzpatrick Comminuting Machine fitted with No. 1A screen with knives forward. Thereafter, the mix was returned to the mixer and moistened with water to a thick paste. The moist mass was passed through a No. 12 screen and the moist granules were dried on a paper-lined trays. The dried granules were returned to the mixer, 3 parts of calcium stearate were added and mixed well. The granules were compressed at a tablet weight of 200 mg. using standard concave punches having a diameter of 5/16".

Example 17.—Parenteral formulation

Each 1 cc. ampul contains:

| | |
|---|---|
| 8-methoxy - 2 - methyl-1,2,3,4-tetrahydro-isoquinoline | 1.02 mg. (2% excess) |
| Methyl Paraben, U.S.P. | 1.8 mg. |
| Propyl Paraben, U.S.P. | 0.2 mg. |
| Water for injection, U.S.P. | q.s. ad 1 cc. |

Procedure (for 10,000 cc.): In a clean glass or glass-lined vessel, 8,000 cc. of water for injection were heated to 90° and then cooled to 50–60°. Thereafter, 18 grams of methyl paraben and 2 grams of propyl paraben were added and dissolved with stirring. The solution was allowed to cool to room temperature. 10.20 grams of 8-methoxy-2-methyl - 1,2,3,4 - tetrahydroisoquinoline were added under an atmosphere of nitrogen and stirred until completely dissolved. Sufficient water for injection was then added to make a total volume of 10,000 cc. This solution was filtered through an 02 Selas candle, filled into suitable size ampuls, gassed with nitrogen and sealed. The ampuls were autoclaved at 10 lbs. p.s.i. for 30 minutes.

We claim:
1. A compound of the formula

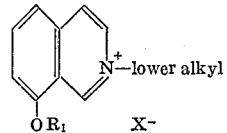

wherein $R_1$ is lower alkyl and $X^-$ is selected from the group consisting of iodine, cholrine and bromine.

2. A compound in accordance with claim 1, 8-methoxy-2-methylisoquinolinium iodide.

3. A compound in accordance with claim 1, 8-methoxy-2-ethylisoquinolinium iodide.

4. 8-methoxy - 2 - methyl-3,4-dihydro-isoquinolinium iodide.

References Cited

UNITED STATES PATENTS

| | | | |
|---|---|---|---|
| 3,101,338 | 8/1963 | Robinson | 260—289 X |
| 3,117,970 | 1/1964 | Weisbach | 260—286 |
| 3,227,720 | 1/1966 | Brossi | 260—289 |
| 3,457,266 | 7/1969 | Gibas | 260—289 |
| 3,466,289 | 9/1969 | Osbond | 260—289 X |
| 3,475,538 | 10/1969 | Mathison | 260—286 Q |
| 3,562,280 | 2/1971 | Leimgruber et al. | 260—289 |

DONALD D. DAUS, Primary Examiner